United States Patent [19]

Schmidt

[11] 4,445,600

[45] May 1, 1984

[54] SELF ADJUSTING RELEASE MECHANISM FOR CLUTCH

[75] Inventor: Frederick C. Schmidt, Syracuse, N.Y.

[73] Assignee: Lipe Rollway Corporation, Syracuse, N.Y.

[21] Appl. No.: 264,073

[22] Filed: May 15, 1981

[51] Int. Cl.³ .................... F16D 13/75; F16D 13/54
[52] U.S. Cl. ............................. 192/18 R; 192/70.25; 192/89 R; 192/111 A; 192/98; 188/79.5 GE
[58] Field of Search ............... 192/18 R, 70.25, 70.29, 192/70.3, 89 R, 111 A, 98; 188/196 BA, 79.5 GE

[56] References Cited

U.S. PATENT DOCUMENTS

| | | | |
|---|---|---|---|
| 426,567 | 4/1890 | Leverich | 192/70.3 |
| 2,280,355 | 4/1942 | Root | 192/111 A |
| 2,863,537 | 12/1958 | Root | 192/18 R |
| 3,876,049 | 4/1975 | Linn et al. | 192/111 A |
| 4,108,295 | 8/1978 | de Gennes | 192/111 A |
| 4,109,773 | 8/1978 | Higgerson et al. | 192/111 A |

Primary Examiner—Rodney H. Bonck
Assistant Examiner—James J. Merek
Attorney, Agent, or Firm—Bruns and Jenney

[57] ABSTRACT

A self adjusting release mechanism for disengaging a heavy duty friction clutch that is equipped with a clutch brake. As wear occurs on the facing of the clutch disc, portions of the clutch release mechanism are repositioned to compensate for wear without adversely affecting the operation of either the clutch or the clutch brake. The mechanism includes a sleeve that slidably supports a release bearing housing upon the drive shaft and a spider threaded onto the sleeve which is operatively connected to the pressure plate of the clutch via a plurality of release arms. Rearward movement of the bearing housing first disengages the clutch and then causes the housing to physically contact the clutch brake to retard the motion of the shaft. An adjusting mechanism senses wear on the clutch disc and automatically repositions the spider on the sleeve to compensate therefor without affecting the axial alignment between the release bearing housing and the clutch brake.

11 Claims, 4 Drawing Figures

SELF ADJUSTING RELEASE MECHANISM FOR CLUTCH

BACKGROUND OF THE INVENTION

This invention relates to an improved, self adjusting release mechanism for use in conjunction with a heavy duty clutch that is equipped with a clutch brake and, in particular, to a release mechanism that is capable of automatically compensating for disc wear without disturbing the axial alignment between the clutch release bearing housing and the clutch brake assembly.

A self adjusting release mechanism suitable for use in a heavy duty clutch is disclosed in U.S. Pat. No. 3,876,049. In this type of clutch, the driven clutch disc or discs are disengaged from between the flywheel of the prime mover and the pressure plate of the clutch by means of a pedal-actuated release mechanism. The pedal is typically connected to the release bearing housing of the clutch through appropriate linkage. When the clutch is in an engaged condition, the driving and driven components are urged into friction engagement by means of pressure springs. As wear occurs on the facing of the clutch disc, the springs force the pressure plate of the clutch closer to the flywheel. Accordingly, greater axial movement of the release bearing housing is normally required in order to achieve clutch braking. Adjustment of the release mechanism, due to facing wear, is soon required in order to maintain the pedal linkage within acceptable operating boundaries. As described in the noted patent, this adjustment is sometimes made automatically by means of a pawl and ratchet arrangement which serves to move the release bearing housing away from the flywheel.

Many clutch units are now equipped with a torque limiting brake which is positioned between the release bearing housing and the transmission. Depressing the clutch pedal to a first position moves the housing, and thus the release mechanism, back a sufficient distance to release the clutch. The released drive shaft, however, continues to rotate at a relatively high speed due to inertia. As described in U.S. Pat. No. 4,046,237, depressing the clutch pedal beyond the initial release position moves the release bearing housing back into friction engagement with the clutch brake unit resulting in the shaft being brought to a controlled stop. As can be seen, in this type of clutch arrangement axial movement of the release bearing housing provides for the release of the clutch as well as the braking of the drive shaft. In order to compensate for disc wear while at the same time retaining continued operation of the clutch, the release housing must be continually repositioned in the assembly.

SUMMARY OF THE INVENTION

It is therefore a primary object of the present invention to improve self adjusting clutch mechanisms.

A further object of the present invention is to provide an improved self adjusting release mechanism for use in clutches that are equipped with clutch brake units.

A still further object of the present invention is to provide a self adjusting release mechanism that can compensate for disc wear without having to change the position of the clutch release bearing housing.

Yet another object of the present invention is to provide for continuous and efficient operation of a clutch that is equipped with a clutch brake.

These and other objects of the present invention are attained by means of a release mechanism that is suitable for use in a clutch assembly which is equipped with a clutch brake. The release mechanism includes a sleeve that is slidably mounted upon the drive shaft immediately behind the pressure plate. A spider is threaded onto the sleeve which engages a number of release lever arms, the arms to disengage the clutch when the sleeve is moved axially along the shaft away from the pressure plate. A release bearing housing is secured to the sleeve behind the spider and is connected through suitable linkage to a clutch pedal. When the pedal is depressed the release mechanism is moved back to disengage the clutch. Further depression of the clutch pedal places the housing in friction engagement against the clutch brake to slow down and/or stop the released but freely turning drive shaft. An automatically operated adjusting mechanism is secured to the sleeve in between the release bearing housing and the spider which senses wear on the driven disc or discs of the clutch as the clutch is being disengaged, and, in response thereto, repositions the spider axially upon the sleeve to compensate to wear without disturbing the position of the release bearing housing. Accordingly, adjustment for wear is made without affecting the travel distance between the release bearing housing and the clutch brake assembly.

BRIEF DESCRIPTION OF THE DRAWINGS

For a better understanding of these and other objects of the present invention, reference is had to the following detailed description of the invention which is to be read in conjunction with the accompanying drawings, wherein.

DESCRIPTION OF THE INVENTION

Figure 1:
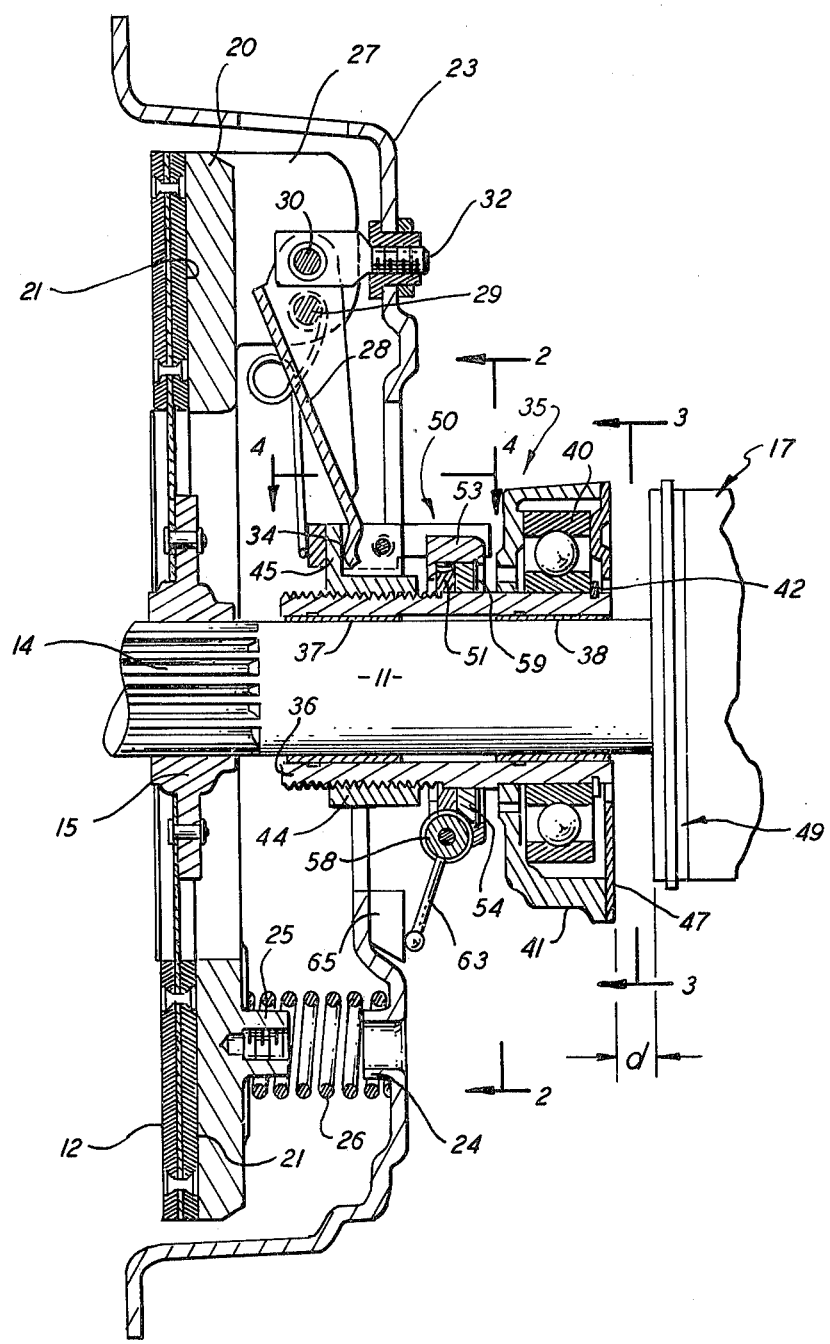
FIG. 1 is an axial sectional view of a clutch assembly embodying the teachings of the present invention.

Referring now to the drawings, wherein like numbers are used to designate like parts, there is shown a clutch assembly 10 that accepts an axially aligned splined shaft 11. A driven disc assembly 12 is mounted upon the spline 14 of the shaft by means of a hub 15 so that the disc is capable of turning with the shaft and at the same time allowed to slide axially along the shaft. Torque from a prime mover is delivered to the driven disc via a flywheel (not shown) causing the shaft to rotate and thus deliver power to transmission 17.

Disposed in axial alignment with the shaft 11 is an annular pressure plate 20 which contains a friction surface 21 for engaging clutch driven disc assembly 12 and forcing the disc into friction driving contact against the flywheel. The clutch cover 23 has a plurality of bosses 24 formed on its inner surface that are aligned with similar bosses 25 on the pressure plate. The opposed bosses coact to support a plurality of springs in compression between the pressure plate and the cover to continually urge the clutch disc into engagement with the flywheel. When so engaged, the clutch disc transmits torque from the flywheel to the drive shaft.

The pressure plate assembly also includes a plurality of rearwardly projected mounting lugs 27 for pivotably supporting a clutch release arm 28 therein by means of a trunnion 29. Each arm is also pivotably connected by means of a pin 30 to the squared end of an eyebolt 32 which is threaded into the cover adjusting nut and held in place by a locknut as illustrated in FIG. 1. The distal end 34 of each release arm is received in a release mechanism, generally referenced 35, that embodies the teaching of the present invention. The release mechanism is slidably mounted upon the drive shaft behind the pressure plate. The release mechanism is for a pull type clutch meaning that it must be moved rearwardly along the shaft in order to disengage the clutch. Rearward movement of the mechanism causes the arms to force the pressure plate back against the biasing action of the springs thereby disengaging the driven clutch components from the driving components.

The present release mechanism includes a sleeve 36 that is slidably mounted upon the drive shaft by a pair of bushings 37,38. A release bearing 40 is fitted onto an undercut section formed at the rear of the sleeve and the bearing is contained within a release bearing housing 41 that is adapted to move axially with the sleeve. The inner race of the bearing is retained on the sleeve by means of a retaining ring 42.

Figure 3:
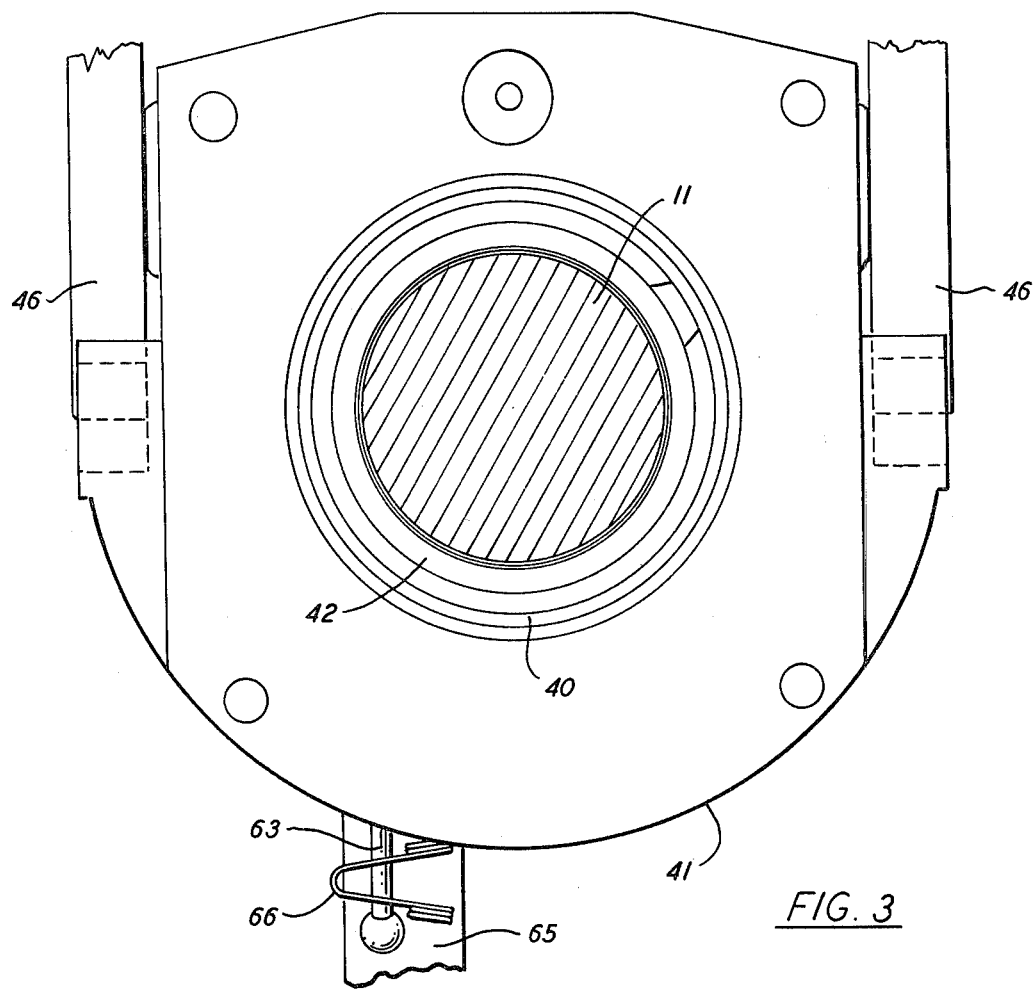
FIG. 3 is also a partial end view taken along lines 3—3 in FIG. 1 showing the release bearing housing utilized in the clutch release mechanism.

A spider 44 is threaded onto the front end of the sleeve as shown. The spider contains a cylindrical body and three equally-spaced, channel-shaped lugs 45 for receiving the distal ends of the release arms therein. As seen in FIG. 3, a yoke 46 is attached to the release bearing housing 41 and is connected through any suitable linkage to a clutch pedal (not shown). Depressing the pedal to a first distance forces the housing and thus the release mechanism back towards transmission 17 (FIG. 1) which, as explained above, disengages the clutch. Further depression of the pedal forces the flat friction surface 47 on the back of the housing to operatively engage the clutch brake unit 49. As explained in greater detail in U.S. Pat. No. 4,186,826, forcing the housing against the clutch brake, brings the rotating drive shaft to a safe controlled stop. Braking the shaft saves wear on the transmission parts and also provides for a more efficient shifting of gears.

As can be seen, the normal distance d between the face of the clutch brake and the friction surface on the release bearing housing must be maintained within specific limits in order to insure that the clutch brake operates properly. It is therefore important to adjust the release mechanism periodically in order to compensate for wear on the clutch discs. The forward shifting of the entire mechanism, however, usually takes the housing outside of prescribed brake travel limits whereupon effective actuation of the brake 49 cannot be maintained. As will be explained in greater detail below, an automatically actuated self adjusting device 50 is operatively connected to the release mechanism which allows for wear compensation without moving the release bearing housing beyond specified limits.

Figure 2:
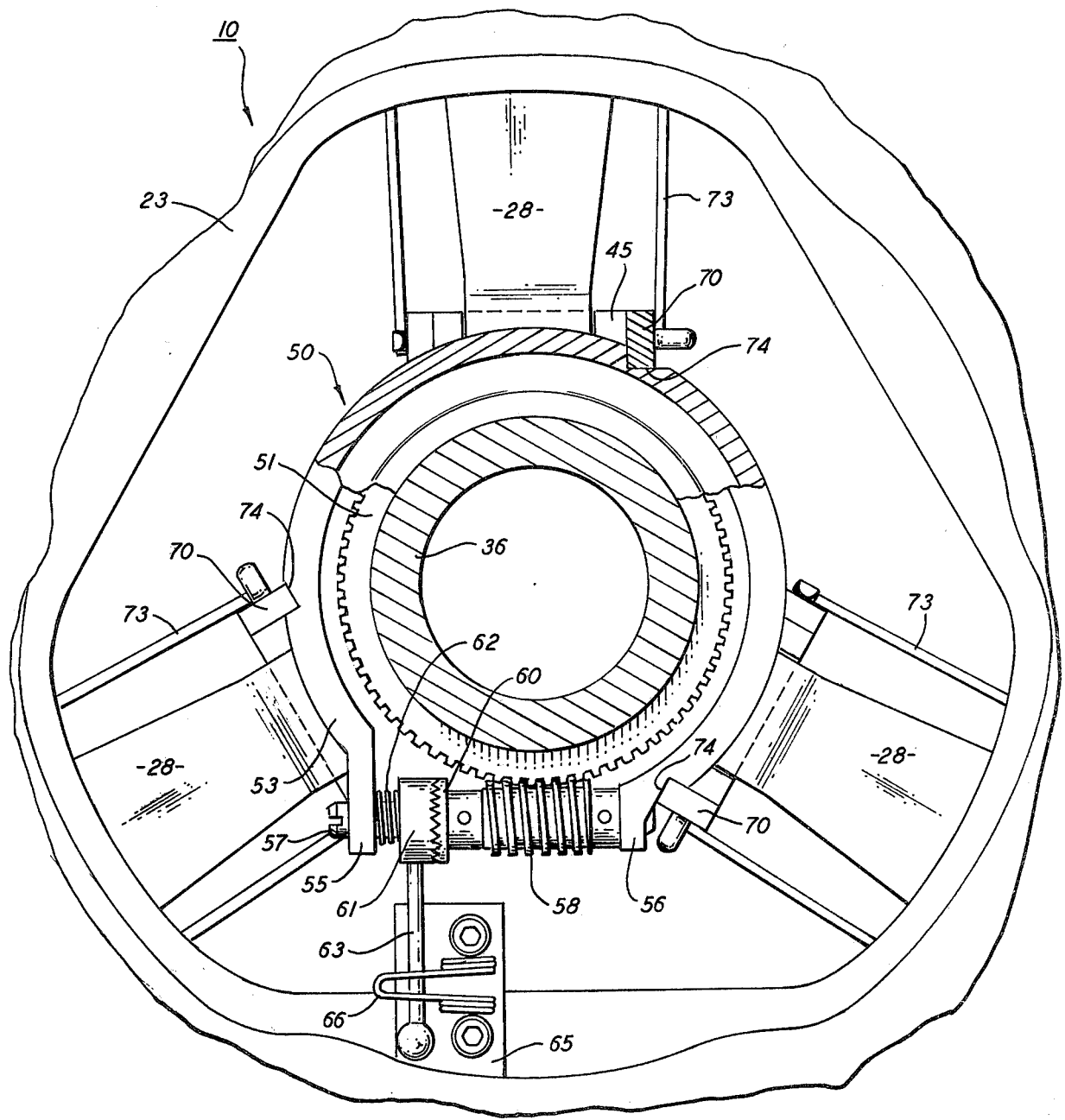
FIG. 2 is an enlarged partial end view taken along lines 2—2 in FIG. 1 showing the sensing and adjusting mechanism utilized in the present invention.
Figure 4:
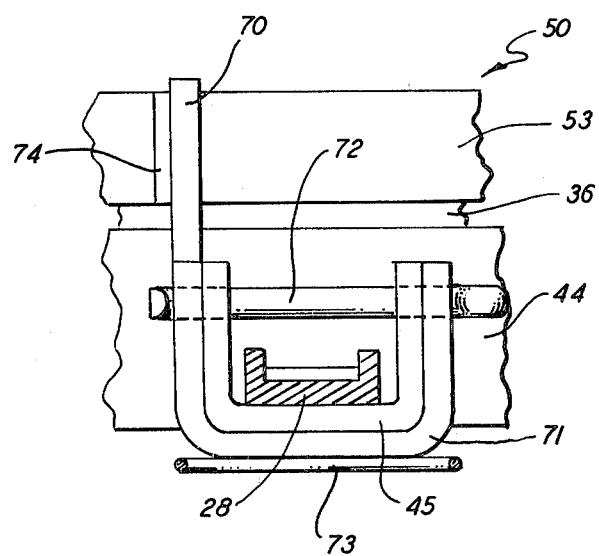
FIG. 4 is an enlarged partial top view taken along lines 4—4 in FIG. 1 showing the drive lug arrangement for connecting the spider of the release mechanism with the sensing and adjusting mechanism.

As best illustrated in FIGS. 2 and 4, the present adjusting unit includes a worm gear 51 that is brazed or otherwise secured to the sleeve so that the wheel and the sleeve rotate as a single unit about the axis of the drive shaft. The worm gear is rotatably contained within a gear housing 53 by means of an annular spacer 54 and retaining ring 59. The gear housing includes two spaced-apart, downwardly depending, flanges 55 and 56 that rotatably support an indexing shaft 57 therebetween. A worm 58 is secured to the shaft so that it is in meshing engagement with the worm gear. A ratchet 60 is pinned to the indexing shaft to one side of the worm which engages a pawl 61. The pawl, in turn, is mounted for rotation upon the shaft and is held in operative contact against the ratchet by means of a spring 62. An elongated actuating arm 63 is secured at one end to the pawl and the other end of the arm is placed against a control pad 65 attached to the clutch cover. The arm is held securely against the pad via spring 66.

Three drive lugs 70—70 are slidably contained within V-shaped cutouts 74 provided in the outer periphery of the gear housing. A U-shaped connector 71 is provided at the terminal end of each drive lug which, as shown in FIG. 4, passes around one of the spider lugs and is secured in place via cotter pin 72. A retaining spring 73 passes behind each drive lug and serves to place a biasing pressure on the release arm mechanism as shown in FIG. 1. As can be seen, the drive lugs impart the rotational motion described by the spider to the gear housing 53 while at the same time permitting the spacing between the two units to be altered axially. Turning the worm gear within the gear housing produces a corresponding turning of the threaded portion of the sleeve within the spider thereby axially repositioning the spider without disturbing the position of the release bearing housing relative to the clutch brake.

Where the clutch disc facing begins to wear under normal operating conditions, the release lever arms 28 pull the release mechanism forward toward the flywheel thereby increasing the amount of travel required in order for the release bearing housing to contact the clutch brake. However, in the event the release bearing assembly is caused to travel beyond a prescribed distance during clutch release, adjusting arm 63 attached to pawl 61 is caused to rotate a sufficient distance to advance the pawl teeth a full notch in the ratchet. Release of the clutch pedal therefore turns the worm and advances the worm gear. This, in turn, runs the spider out upon the sleeve a distance that is substantially equal to the amount of sensed wear. The mechanism thus continually adjusts for disc wear over the life of the clutch unit while at the same time maintaining the specified brake travel within desired operating limits.

While this invention has been described with reference to the details as set forth above, it is not limited to the specific structure as disclosed and the invention is intended to cover any modifications or changes as may come within the scope of the following claims.

I claim:

1. A self adjusting clutch release mechanism that includes a sleeve slidably mounted upon a drive shaft behind a clutch disc, a spider threaded upon the front end of the sleeve for receiving therein biased clutch release arms that operatively connect the spider to the clutch to urge the sleeve into a full forward position when the clutch disc is engaged, a release bearing housing secured to the back of the sleeve for movement therewith, a clutch brake mounted upon the shaft behind the housing, actuating means for moving the release bearing housing rearwardly a first distance whereby the release arms disengage the clutch disc and a second greater distance whereby the housing engages the clutch brake, sensing means for sensing the full forward position of the sleeve and thereby detecting clutch disc wear, and a worm gear secured to the sleeve and a worm in meshing engagement with the gear that is connected to said sensing means for advancing the spider upon the threaded end of the sleeve to compensate for clutch wear whereby the travel distance between the housing and the clutch brake remains relatively constant.

2. The release mechanism of claim 1 wherein said worm is rotatably supported within a gear housing and which further includes means for rotating the gear housing in unison with the spider about the drive shaft.

3. The release mechanism of claim 1 wherein said sensing means further includes a pawl and ratchet unit connected to the worm for advancing the worm gear in one direction and an elongated arm extending between the pawl and a cover adapted to move axially with the clutch disc to advance the ratchet incrementally in response to disc wear.

4. The release mechanism of claim 3 that further includes a clamping means for holding the arm against the cover.

5. The release mechanism of claim 2 wherein said means to rotate said gear housing further includes at least one axially extended lug secured at one end to the spider and slidably secured in the gear housing to permit the spider to be axially repositioned in relation to said gear housing while simultaneously rotating about the shaft therewith.

6. The release mechanism of claim 3 wherein the worm and the ratchet means are both mounted upon a common support shaft mounted within the gear housing.

7. In a clutch release mechanism of the type having a pedal-actuated sleeve slidably mounted upon a drive shaft and a release bearing housing affixed to the rear of the sleeve for engaging a clutch brake mounted upon the shaft behind the housing, the improvement comprising a spider threaded onto the sleeve which is connected to the clutch for disengaging said clutch, biasing means for slidably moving the sleeve to a full forward position when the clutch is engaged, a worm gear affixed to the sleeve and being rotatably supported within a gear housing, connecting means operatively joining the gear housing to the spider so that both rotate together around the shaft, a worm supported in the gear housing which is in meshing engagement with the worm gear, sensing means for determining the full forward travel of the sleeve when the clutch is engaged so as to detect clutch disc wear, and adjusting means responsive to the sensing means for turning the worm when a predetermined amount of disc wear is detected and thereby repositioning the spider upon the sleeve to compensate for said wear.

8. The improvement of claim 7 wherein said adjusting means includes a pawl and ratchet unit connected to the worm, and said sensing means includes an arm extending between the pawl and the cover of the clutch.

9. The improvement of claim 8 that further includes a clamping means for holding the arm against a pad secured to said cover.

10. The improvement of claim 7 wherein said connecting means further includes at least one axially extended lug that is secured at one end to the spider and slidably mounted at the other end in the gear housing to allow the spider to be repositioned axially in relation to said gear housing.

11. The improvement of claim 10 wherein a plurality of lugs are equally spaced about the sleeve.

* * * * *